Figure 1:
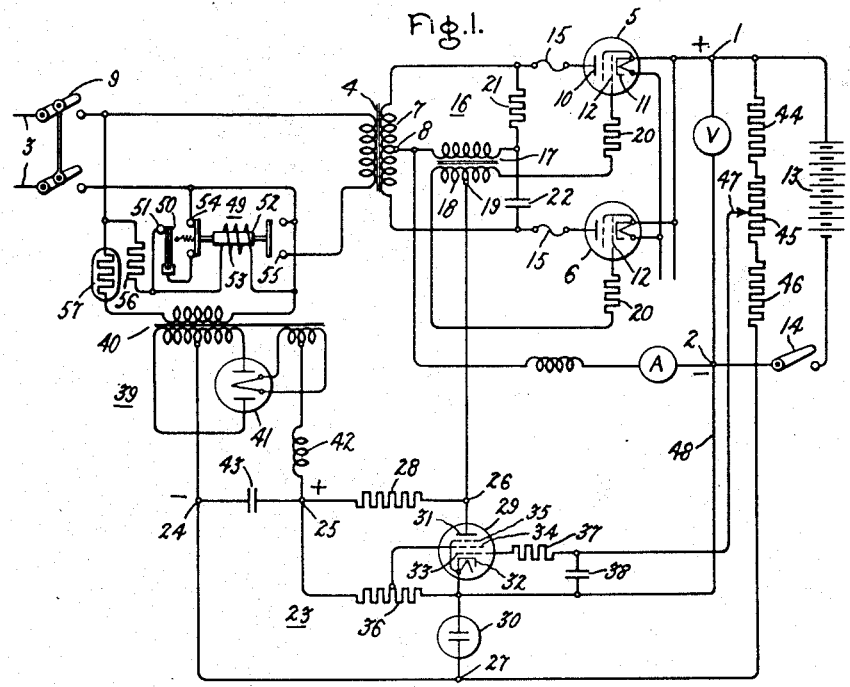

March 26, 1940.                E. E. MOYER                2,195,121
                          ELECTRIC VALVE CIRCUITS
                           Filed Dec. 17, 1938

Inventor:
Elmo E. Moyer,
by Harry E. Dunham
His Attorney.

Patented Mar. 26, 1940

2,195,121

BEST AVAILABLE COPY

UNITED STATES PATENT OFFICE 2,195,121

ELECTRIC VALVE CIRCUITS

Elmo E. Moyer, Scotia, N. Y., assignor to General Electric Company, a corporation of New York Application December 17, 1938, Serial No. 246,419

12 Claims. (Cl. 175—363)

My invention relates to electric valve circuits and more particularly to control systems for electric valve translating apparatus.

In the application of electric valve systems, it is frequently desirable to maintain an output voltage within a narrowly defined range of values. For example, in electric valve translating apparatus for battery charging systems, it is important to maintain the voltage impressed across the batteries at a substantially constant value. In accordance with the embodiments of my invention described hereinafter, I provide new and improved control systems which maintain the output voltage of electric valve translating apparatus at a substantially constant value.

It is an object of my invention to provide new and improved electric valve circuits.

It is another object of my invention to provide new and improved control systems for electric valve translating apparatus.

In accordance with the illustrated embodiments of my invention described hereinafter, I provide new and improved electric valve translating circuits for transmitting power from an alternating current supply circuit to a direct current load circuit. I provide improved control systems whereby the direct current output voltage is maintained at a substantially constant value. The electric valve translating apparatus comprises an electric valve means of the controlled type having control members for controlling the conductivity thereof, and includes an excitation circuit which impresses on the control members alternating components of voltage of predetermined phase displacement relative to the anode-cathode voltages. A variable unidirectional potential is superimposed on the alternating component of voltage to control the conductivities of the electric valve means in order that the output voltage of the translating apparatus be maintained at a substantially constant value. The unidirectional biasing potential is provided by means of a control circuit which comprises in series relation, an impedance element, an electronic discharge device of the high vacuum type comprising a pair of control grids and an electric valve of the glow discharge type, which are energized in series relation from a source of substantially constant unidirectional voltage. The source of unidirectional voltage may be supplied by a bi-phase rectifier which is connected to the alternating current supply circuit. A voltage divider is connected across the impedance element and the electronic discharge device and impresses on one of the control grids a potential to control the conductivity of the discharge device. Another circuit energized from the direct current load circuit is connected across the glow discharge valve and produces a signal voltage. A negative unidirectional voltage in opposition to that derived from the direct current circuit is provided by the glow discharge valve and the resultant of the negative voltage and a predetermined component of the signal voltage is impressed on the other control grid. The resultant unidirectional potential which is impressed on this grid varies in accordance with the magnitude of the voltage of the direct current load circuit.

In accordance with another of the illustrated embodiments of my invention, I provide an improved control circuit for electric valve translating apparatus which energizes a direct current load circuit from an alternating current supply circuit, and in which the control of the system is made independent of fluctuations of the magnitude of the voltage of the alternating current supply circuit.

Means comprising a second glow discharge valve is connected across the impedance element and serves to render the system independent of variations in the supply voltage.

Figure 2:
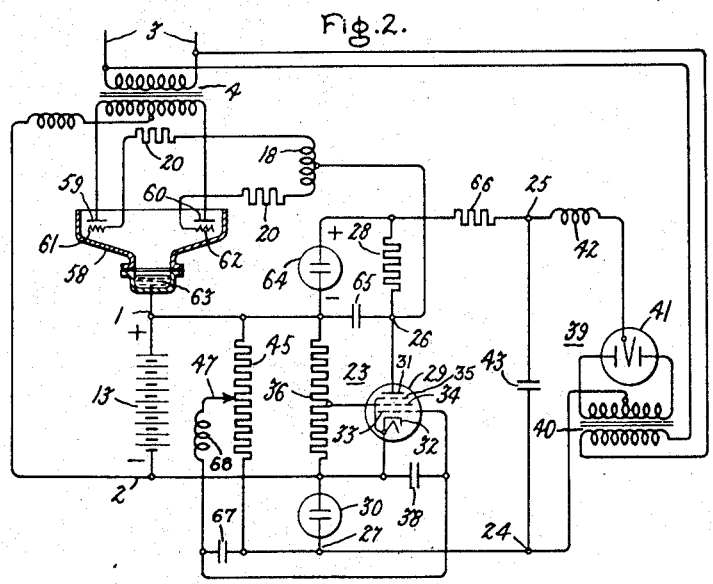

For a better understanding of my invention, reference may be had to the following description taken in connection with the accompanying drawing, and its scope will be pointed out in the appended claims. Fig. 1 diagrammatically illustrates an embodiment of my invention as applied to an electric valve translating circuit for battery charging systems, and Fig. 2 diagrammatically illustrates a modification of the arrangement shown in Fig. 1.

Referring more particularly to the embodiment of my invention shown in Fig. 1, I provide an electric valve translating circuit for energizing a direct current load circuit, comprising conductors 1 and 2, from an alternating current supply circuit 3, through a transformer 4 and electric valve means 5 and 6. The transformer 4 may comprise a secondary winding 7 having an electrically intermediate connection 8, and may be energized from the supply circuit 3 through a circuit controlling means such as a switch 9.

The electric valve means 5 and 6 are preferably of the type employing an ionizable medium, such as a gas or a vapor, and may be of the electrostatically controlled type each comprising an anode 10, a cathode 11 and a control member 12. The load circuit comprising conductors 1 and 2 may be connected to charge a battery 13, and a switch 14 may be connected in series relation with the battery 13. Suitable current limiting devices, such as fuses 15, may be connected in series relation with the electric valve means 5 and 6.

I provide an excitation circuit 16 which impresses on the control members 12 of electric valve means 5 and 6 alternating components of voltage of predetermined phase displacement relative to the anode-cathode voltages of these valves. The excitation circuit 16 may comprise a transformer 17 having a secondary winding 18 provided with an electrically intermediate connection 19 and a primary winding. The excitation circuit also comprises a suitable phase shifting means which may be of the static impedance type comprising a resistance 21 and a capacitance 22 and which may be connected across secondary windings 7 of transformer 4. Resistance 21 and capacitance 22 may be proportioned so that the voltages impressed on the control members 12 lag the anode-cathode voltage of the electric valve means 5 and 6 by substantially 90 electrical degrees. Current limiting resistances 20 are connected in series relation with the control members 12.

In order to control the conductivities of the electric valves 5 and 6, I provide a control circuit 23 including input terminals 24, 25 and output terminals 1 or 27 and 26. The lower terminal 27 of glow discharge valve 30 is connected to the lower terminal of resistance 46. The control circuit 23 comprises in series relation a suitable impedance element such as a resistance 28, an electronic discharge device 29 preferably of the high vacuum type, and an electric valve 30 of the glow discharge type, which operates as a constant voltage device. The electronic discharge device 29 comprises an anode 31, a cathode 32, a control grid 33, a second control grid 34 and a suppressor grid 35 which may be connected to the cathode 32. A potentiometer comprising a resistance 36 is connected across the resistance 28 and the electronic discharge device 29 and impresses on control grid 34 a unidirectional control potential. A current limiting resistance 37 may be connected in series relation with the control grid 33, and a capacitance 38 may be connected to absorb extraneous transient voltages which may be present in the system.

As a means for impressing across the input terminals 24 and 25 of the control grid 23 a unidirectional voltage of substantially constant magnitude, I provide a suitable rectifier such as a biphase rectifier 39 comprising a transformer 40, an electric valve means 41 and a filter circuit comprising an inductance 42 and a capacitance 43.

A means energized from the direct current circuit including conductors 1 and 2 furnishes a signal voltage and is applied in series with the terminals of the glow discharge valve 30, which produces a constant negative unidirectional reference voltage. The signal voltage, which is a predetermined component of the voltage of the direct current circuit, is obtained by means of a voltage divider comprising resistances 44, 45 and 46, the resistance 45 being provided with an adjustable contact 47. The voltage 47, 32 which includes the variable voltage derived from the direct current load circuit is impressed on control grid 33 of electronic discharge device 29 to control the conductivity thereof in accordance with the voltage of the direct current circuit. Cathode 32 of electronic discharge device 29 is connected to conductor 2 of the direct current circuit through a conductor 48. The voltage between terminals 24, 25 must be greater than the voltage between points 1, 27 by the amount necessary for the desired phase shift of the voltages impressed on control members 12, that is, equal to or greater than the peak value of the alternating component of voltage impressed on control members 12.

I provide a time delay relay 49 which delays the energization of the transformer 4 for a predetermined interval of time after the operation of switch 9 in order that the cathodes of electric valve means 5 and 6 may attain a suitable temperature prior to the operation of the electric valve means. The time delay relay 49 comprises a thermostatic member 50 which may be of the bimetallic type having a cooperating contact 51, an armature member 52, an actuating coil 53 therefor, a pair of normally closed contacts 54, and a pair of contacts 55 which serve to effect energization of the primary winding of transformer 4 when in the closed circuit position. The armature member 52 may be spring biased to the position shown. A suitable heating means, such as a resistance 56, may be associated with the bimetallic member 50 to effect operation thereof a predetermined time after the closure of switch 9.

In order to maintain the output voltage of the rectifier 39 at a substantially constant value independent of variations in the magnitude of the voltage of circuit 3, I provide in series relation with the primary winding of transformer 40 a suitable impedance element, such as a ballast resistance 57 having a current-impedance characteristic such that the voltage impressed on the primary winding 40 remains substantially constant. The ballast resistance 57 may comprise an iron resistance element in an atmosphere of hydrogen.

The operation of the embodiment of my invention diagrammatically illustrated in Fig. 1 will be explained by considering the system when it is operating to impress across the terminals of the battery 13 a substantially constant unidirectional voltage. As is well understood by those skilled in the art, the average output voltage of the electric valve means 5 and 6 is decreased as the voltages impressed on the control members 12 are retarded in phase with respect to the anode-cathode voltages. That is, the direct current output voltage of the electric valve system is maximum when there is substantial phase coincidence between the control member voltages and the anode-cathode voltages, and is decreased in value as the control member voltages are retarded in phase. The excitation circuit 16 impresses on the control members 12 an alternating component of voltage of substantially 90 electrical degrees phase displacement in the lagging direction, and the control circuit 23 superimposes on the alternating components of voltage a variable unidirectional component which controls the conductivities of electric valve means 5 and 6 in order that the voltage of the direct current circuit including conductors 1 and 2 remains at a substantially constant value. The rectifier circuit 39 impresses across input terminals 24 and 25 of control circuit 23 a substantially constant unidirectional voltage. The electronic discharge device transmits variable amounts of unidirectional current through the resistance 28 to control the potential of terminal 26 relative to conductor 1, thereby controlling the resultant potential impressed on the control members 12 and effecting control of the currents conducted by electric valve means 5 and 6. Resistance 28, electronic discharge device 29 and glow discharge valve 30 conduct current from the direct current source. A part of the current conducted by glow discharge valve 30 is derived from resistance 36 which is connected in parallel with resistance 28 and discharge device 29. The control potentials impressed on control grids 33 and 34 determine the potential of terminal 26 relative to the potential of conductor 1, and thereby control the conductivities of electric valves 5 and 6.

If it be assumed that the voltage of the direct current load circuit including conductors 1 and 2 tends to rise above the predetermined value which is established by the initial adjustment, the component of voltage impressed on control grid 33 is increased by the exact number of volts variation in the voltage of the load circuit to increase the amount of current conducted by the electronic discharge device 29 and effects a lowering of the potential of terminal 26 relative to the potential of conductor 1, thereby decreasing the conductivities of the electric valve means 5 and 6 and tending to restore the voltage of the load circuit to the desired value. Glow discharge valve 30 affords a constant voltage which opposes the signal voltage. Conversely, if the voltage of the load circuit decreases below the desired value, the control potential impressed on control grid 33 is correspondingly reduced by the same number of volts change to decrease the current conducted by electronic discharge device 29. As a result, the potential of terminal 26 is raised with respect to the potential of conductor 1 and effects an increase in the current conducted by electric valve means 5 and 6. Consequently, the voltage of the load circuit is raised to the desired value.

The operation of the time delay relay 49 in initiating operation of the system may be explained as follows. Initially, the armature member 52 of the relay 49 is maintained in the position shown in the figure by virtue of the spring bias. Upon closure of switch 9, the heating element including resistance 56 is energized and after the lapse of a predetermined interval of time, the bimetallic member 50 moves to the right-hand position, opening contact 51. Upon opening of the contact 51, the actuating coil 53 which previously was short-circuited by the thermostatic member 50, is effectively connected across the supply circuit 3 and moves the armature member 52 to the right-hand position, thereby closing contacts 55 and connecting the transformer 4 across the supply circuit 3.

Fig. 2 of the drawing diagrammatically illustrates another embodiment of my invention which is similar in many respects to that shown in Fig. 1, and corresponding elements have been assigned like reference numerals. Instead of showing the two separate valves, an electric valve means 58 comprising two arc discharge paths is shown comprising anodes 59, 60, associated control members 61, 62, and a cathode 63.

A variable unidirectional control potential is also impressed on the control member 34 of the electronic discharge device 29 by means of resistance 36. In this embodiment of my invention, the control members 33 and 34 operate conjointly to control the conductivity of the electronic discharge device 29 in accordance with the voltage impressed across the terminals of the battery 13.

In order to render the control circuit 23 independent of the fluctuations in the voltage of the supply circuit 3, I provide means comprising a glow discharge valve 64 which is connected in circuit with the impedance element 28 and which is connected in series relation with resistance 36 and glow discharge valve 30. A capacitance 65 may be connected between the glow discharge valve 64 and the impedance element 28. A suitable impedance, such as a resistance 66, may be connected in series relation with the impedance element 28 and the output circuit of the rectifier 39 to absorb variable amounts of energy due to changes in the output voltage of rectifier 39, occasioned by changes in the voltage of circuit 3. Capacitance 67 and inductance 68 operate as a filtering means.

The general principles of operation of the embodiment of my invention shown in Fig. 2 are substantially the same as those explained above in connection with the arrangement of Fig. 1. In addition, the arrangement of Fig. 2 operates to maintain the voltage of the load circuit, including conductors 1 and 2, at a substantially constant value, independently of the voltage of circuit 3, since a predetermined constant component of unidirectional voltage is introduced into control circuit 23 by means of the glow discharge valve 64. Electronic discharge device 29 conducts variable amounts of current through the impedance element 28 to control the potential of terminal 26 relative to that of conductor 1, and thereby controls the voltage of the load circuit to maintain the voltage at a substantially constant value.

Resistance 28, electronic discharge device 29, glow discharge valve 64 and the potentiometer including resistance 36 operate as a bridge to vary the unidirectional voltage impressed on the control members 61 and 62 of the electric valve means 58. Capacitance 65 may be considered as being connected across opposite points of the bridge and the potential appearing across the terminals of capacitance 65 is the resultant unidirectional voltage which is impressed on the control members 61 and 62. As the conductivity of the electronic discharge device 29 is varied in response to changes in voltage impressed across the terminals of battery 13, the potential of the point 26 changes with respect to that of the cathode 63. The resultant voltage 47, 32 impressed on control grid 33 of electronic discharge device 29 is the sum of two unidirectional voltages, the variable voltage 1, 2 and the fixed voltage 2, 27. One of these components is that derived from resistance 45 through contact 47, and the other is the substantially constant negative unidirectional voltage provided by the glow discharge valve 30.

The principal function of the glow discharge valve 64 is to render the operation of circuit 23 substantially independent of variations in the voltage of the supply circuit 3. The impedance of the circuit including inductance 42, resistance 66, glow discharge valve 64, resistance 36 and glow discharge valve 30 is relatively high so that the slight variations in current transmitted thereby do not appreciably affect the voltage appearing across the terminals of battery 13, which may be considered as a low impedance unit. Resistance 66 absorbs variable amounts of energy due to changes in the voltage of circuit 3, so that the change in potential of point 26 occurs principally in response to changes of the voltage impressed across the terminals of battery 13.

Inasmuch as the voltage appearing across the terminals of glow discharge valves 30 and 64 remains constant due to the characteristics of these valves, the voltage impressed across the terminals of the resistance 36 varies in response to the voltage of battery 13. Accordingly, a variable unidirectional control potential is impressed on control grid 34, and this control grid, acting in conjunction with control grid 33, controls the conductivity of electronic discharge device 29. Of course, the potential impressed on control grid 33 also varies in response to the voltage of battery 13. Control grids 33 and 34 conjointly control the conductivity of the discharge device 29 in response to the voltage of battery 13, which varies the potential of point 26 to control the conductivity of the electric valve means 58.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a direct current circuit, translating apparatus connected between said circuits, control means for said translating apparatus, a control circuit having input terminals and having output terminals for impressing a unidirectional voltage on said control means and comprising a serially connected impedance element and an electronic discharge device for transmitting variable amounts of unidirectional current through said impedance element to produce a control voltage and having a control grid, means energized from said alternating current circuit for impressing across said input terminals a unidirectional voltage of substantially constant value, and a circuit for impressing on said control grid a voltage which varies in accordance with an electrical condition of said direct current circuit and comprising a constant voltage device for producing a constant reference voltage and means for producing a signal voltage.

2. In combination, an alternating current circuit, a direct current circuit, translating apparatus connected between said circuits and comprising electric valve means including a control member for controlling the conductivity thereof, an excitation circuit for energizing said control member, a control circuit having input terminals and having output terminals connected to said excitation circuit and comprising a serially connected impedance element, an electronic discharge device having a control grid and a glow discharge valve for producing a reference voltage, means energized from said alternating current circuit for impressing across said input terminals a unidirectional voltage of substantially constant value, and means for impressing upon said control grid a potential which varies in accordance with an electrical quantity derived from said direct current circuit and which acts in opposition to said reference voltage.

3. In combination, an alternating current supply circuit, a direct current load circuit, electric translating apparatus connected between said circuits and comprising electric valve means having a control member for controlling the conductivity thereof, an excitation circuit for said control member, a control circuit having input terminals and having output terminals connected to said excitation circuit and comprising in series relation an impedance element, an electronic discharge device having an anode, a cathode and two control grids and a glow discharge valve for producing a constant reference voltage which is negative with respect to the potential of said cathode, means for impressing on said input terminals a unidirectional voltage of substantially constant magnitude, and a voltage divider connected across said impedance element and said discharge device for impressing on one of said control grids a control potential, means energized from said load circuit for supplying a control voltage in opposition to that effected by said glow discharge valve, and means for impressing on the other control grid a variable unidirectional voltage which is the resultant of said reference voltage and said control voltage.

4. In combination, an alternating current supply circuit, a direct current load circuit, electric translating apparatus connected between said circuits and comprising electric valve means having a control member for controlling the conductivity thereof, an excitation circuit for impressing on said control member an alternating component of voltage, a control circuit for superimposing on said alternating component of voltage a variable unidirectional component and comprising a serially connected impedance element, an electronic discharge device having two control grids and a glow discharge valve for producing a reference voltage, means for impressing across said control circuit a substantially constant unidirectional voltage, a voltage divider connected across said impedance element and said discharge device for impressing on one of said control grids a control potential, and means energized from said load circuit and comprising a voltage divider for supplying a unidirectional control voltage in opposition to that effected by the transmission of current by said glow discharge valve, and means for impressing on the other of said control grids a resultant of said reference voltage and said control voltage.

5. In combination, an alternating current circuit, a direct current circuit, translating apparatus connected between said circuits and comprising electric valve means including a control member for controlling the conductivity thereof, an excitation circuit for energizing said control member, a control circuit having input terminals and having output terminals connected to said excitation circuit and comprising a serially connected impedance element, an electronic discharge device having a control grid and a glow discharge valve, means energized from said alternating current circuit for impressing across said input terminals a unidirectional voltage, means connected across said impedance element comprising a second glow discharge valve to render the operation of said control circuit independent of variations in the magnitude of the voltage of said alternating current circuit, and means for impressing upon said control grid a potential which varies in accordance with an electrical quantity derived from said direct current circuit.

6. In combination, an alternating current circuit, a direct current circuit, translating apparatus connected between said circuits and comprising electric valve means including a control member for controlling the conductivity thereof, an excitation circuit for energizing said control member, a control circuit having input terminals and having output terminals connected to said excitation circuit and comprising a serially connected impedance element, an electronic discharge device having a control grid and a glow discharge valve for furnishing a constant reference voltage, means energized from said alternating current circuit for impressing across said input terminals a unidirectional voltage, means connected across said impedance element and comprising a second glow discharge valve to render the operation of said control circuit independent of variations in the magnitude of the voltage of said alternating current circuit, and means for impressing upon said control grid a potential which varies in accordance with an electrical quantity derived from said direct current circuit and which acts in opposition to said reference voltage.

7. In combination, an alternating current circuit, a direct current circuit, electric translating apparatus connected between said circuits and comprising electric valve means including a control member for controlling the conductivity thereof, an excitation circuit for energizing said control member, a control circuit having input terminals and having output terminals connected to said excitation circuit and comprising a serially connected impedance element, an electronic discharge device having a control grid and a glow discharge valve for producing a reference voltage, means energized from said alternating current circuit for impressing across said input terminals a unidirectional voltage, means connected across said impedance element and comprising a second glow discharge valve to render the operation of said control circuit independent of variations in the magnitude of the voltage of said alternating current circuit, and a voltage divider connected in series relation with said first mentioned glow discharge valve for impressing on said control grid a variable control potential which is the resultant of said reference voltage and a signal voltage derived from said direct current circuit.

8. In combination, an alternating current circuit, a direct current circuit, electric translating apparatus connected between said circuits and comprising electric valve means having a control member for controlling the conductivity thereof, an excitation circuit for energizing said control member, a control circuit having input terminals and output terminals connected to said excitation circuit and comprising a serially connected impedance element, an electronic discharge device comprising two control grids and a glow discharge valve for producing a reference voltage, means energized from said alternating current circuit for impressing across said input terminals a unidirectional voltage, means connected across said impedance element and comprising a second glow discharge valve to render the operation of said control circuit independent of variations in the magnitude of the voltage of said alternating current circuit, a voltage divider connected in series relation with said first mentioned glow discharge valve for impressing on one of said control grids a variable control potential which is the resultant of said reference voltage and a signal voltage derived from said direct current circuit, and means connected in series relation with said glow discharge valves and being connected across said direct current circuit for impressing a variable control potential on the other of said control grids.

9. In combination, a source of direct current, a control circuit connected across said source and comprising in series relation a glow discharge valve and a bridge circuit, said bridge circuit comprising two electric paths, one of said electric paths including a serially connected impedance element and an electronic discharge device having a control grid, the other electric path comprising a serially connected glow discharge valve and a resistance, and means for varying the potential of said control grid to control the potential difference between the common juncture of said impedance element and said electronic discharge device and the common juncture of said second mentioned glow discharge valve and said resistance.

10. In combination, a source of direct current, a serially connected glow discharge valve and a bridge circuit having a pair of output terminals and a pair of electric paths, one of said electric paths comprising a serially connected impedance element and an electronic discharge device including a control grid, the other electric path including a serially connected glow discharge valve and a resistance, said output terminals being connected to the common juncture of said impedance element and said electronic discharge device and the common juncture of said second mentioned glow discharge valve and said resistance, and means for controlling the potential of said control grid to control the voltage appearing across said output terminals.

11. In combination, a source of direct current, an electric bridge circuit energized from said source and comprising a pair of electric paths, one of said electric paths including a serially connected impedance element and an electronic discharge device having a control grid, the other electric path including a serially connected glow discharge valve and a resistance, means connected between the common juncture of said impedance element and said discharge device and the common juncture of said glow discharge valve and said resistance, and means for impressing a variable control potential on said control grid to control the voltage appearing across said last mentioned means.

12. In combination, a source of direct current, a bridge circuit energized from said source and comprising a pair of output terminals, said bridge circuit comprising a pair of electric paths one of which includes a serially connected impedance element and an electronic discharge device having a control grid and the other electric path including a serially connected glow discharge valve and a resistance, said output terminals being connected to the common juncture of said impedance element and said discharge device and the common juncture of said glow discharge valve and said resistance, a capacitance connected across said common junctures, and means for impressing on said control grid a variable potential to vary the voltage appearang across said capacitance.

ELMO E. MOYER.